Figure 1:
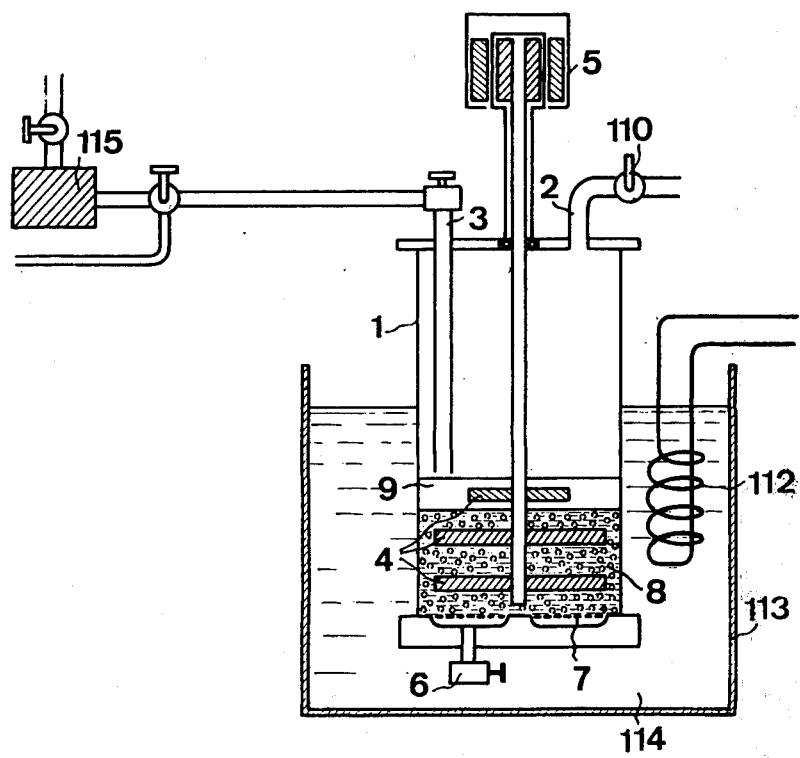

United States Patent [19]

Francois et al.

[11] 4,048,420
[45] Sept. 13, 1977

[54] POLYMERIZATIONS CATALYZED BY VERY FINELY DIVIDED LITHIUM

[75] Inventors: Bernard Francois, Strasbourg; Michel Vernois, Puteaux; Emile Franta, Souffelweyershein, all of France

[73] Assignee: Agence Nationale de Valorisation de la Recherche (ANVAR), Neuilly sur Seine, France

[21] Appl. No.: 653,749

[22] Filed: Jan. 30, 1976

[30] Foreign Application Priority Data

Feb. 7, 1975 France .................................. 75.03891

[51] Int. Cl.² ............................ C08F 4/02; C08F 4/08
[52] U.S. Cl. ................................ 526/173; 260/680 B; 260/879; 526/62; 526/240
[58] Field of Search ................................ 526/173, 62

[56] References Cited

U.S. PATENT DOCUMENTS

| 3,265,759 | 8/1966 | Cain | 526/173 |
| 3,285,901 | 11/1966 | Forman | 526/173 |
| 3,306,949 | 2/1967 | Mertzweiller et al. | 526/173 |
| 3,488,332 | 1/1970 | Hiraoka et al. | 526/173 |

Primary Examiner—William F. Hamrock
Attorney, Agent, or Firm—Hammond & Littell

[57] ABSTRACT

Polymerizations catalyzed by very finely divided lithium.

The process is characterized in using lithium having an average particle diameter of less than 2μ and preferably of 0.1μ or less as a polymerization initiator.

The process permits α-ω dilithic oligomers to be obtained.

9 Claims, 2 Drawing Figures

POLYMERIZATIONS CATALYZED BY VERY FINELY DIVIDED LITHIUM

The present invention relates to the field of anionic polymerizations catalyzed by lithium.

Its object is more precisely a process for obtaining low molecular weight α-ω dilithic polymers and copolymers in the presence of a catalyst consisting of very finely divided lithium.

A considerable amount of research has been carried out on anionic polymerization initiated by lithium or organic derivatives thereof in a non-polar medium, as it enables polymers possessing very advantageous microstructures to be obtained (1,4-cis- polyisoprene, 1-4 polybutadiene for example).

The preparation and use of monolithic compound initiators are well known, whereas numerous difficulties arise in the production of dilithic initiators.

With the previously known processes of polymerizations catalyzed with lithium and conducted in non-polar medium it was only possible to obtain large mass macromolecules. The production of small dilithic molecules for use as initiators for other polymerizations comes up against a problem of insolubility and non-reactivity in a non-polar medium. In order to overcome these drawbacks, it has been suggested that oligomerizations be carried out in a very slightly polar medium, obtained by adding traces of a polar solvent, such as an ether, to a non-polar solvent, and then, as far as possible, removing the traces of polar solvent which have been introduced. However, the polarity of the lithium ion, associated with its small ionic radius, results in a strong solvation of said ion making it impossible to completely remove the said solvent. As a result, there is considerable loss of the stereoregularity of the polymers obtained with said initiators.

Starting with conjugated dienic monomers, it was therefore previously impossible to obtain oligomers which were simultaneously α-ω dilithic having more than 85% 1-4 cis stereoregularity and with a mean molecular mass lower than 50,000.

Said limits were associated with the use of lithium particles having a mesh size of 20μ or larger.

The object of the process of the invention is the polymerization of vinyl or diene monomers catalyzed by lithium, characterized in that lithium having a mean particle diameter of less than 2μ, and more particularly of 0.1μ or less is used as a polymerization initiator.

Diene or conjugated diene monomers can be used as, notably, isoprene, 1,3-butadiene, or vinyl monomers such as, notably, styrene, α-methylstyrene and the alkyl derivatives of styrene, acrylonitrile or similar compounds.

It is possible, by using a mixture of the monomers previously mentioned, to effect the copolymerization of two or more of said monomers; α-ω dilithic copolymers are thus obtained. It is understood that the term "polymerizations" also included copolymerizations.

As a particularly advantageous example of such copolymers, a styrene-isoprene copolymer may be mentioned.

As has already been stated, the polymers obtained according to the invention are α-ω dilithic, it is therefore possible and advantageous to deactivate them in order to supply the ends of the chains with functional terminal groups.

Such reactions can be effected in a known manner according to the groups to be grafted.

A few examples of grafting functional radicals onto the end of chains may be briefly mentioned here:

OH group by the action of oxygen (to obtain glycols)

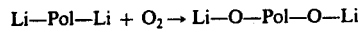

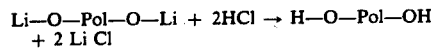

Pol = polymer

Acid COOH group by the action of $CO_2$

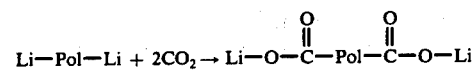

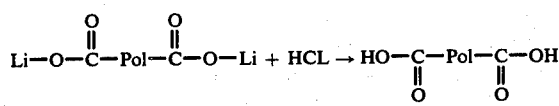

Cl group by the action of chloride $$Li-Pol-Li + 2Cl_2 \rightarrow Cl-Pol-Cl + 2\,LiCl$$

group by the action of phosgene

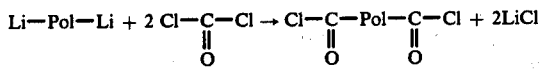

Phosphonation

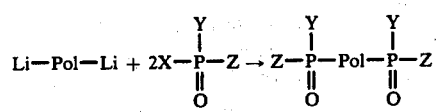

X, Y, Z can be the same and represent halogen groups, for example, or X, Y are identical halogen atoms and Z is an alkyl group; or X is a halogen and Y, Z are identical or different alkyl radicals.

A particularly advantageous compound is obtained when X, Y and Z are each a chloride atom.

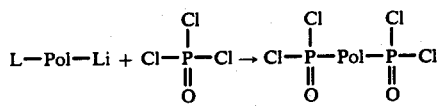

such bodies can be deactivated with water by the following process:

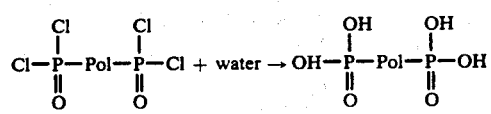

deactivation with an alcohol is carried out as follows:

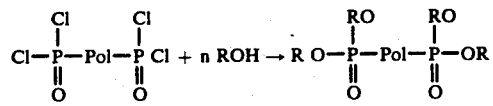

SO₃H group by the action of sulfurylchloride and deactivation with water

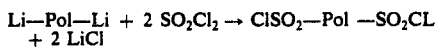

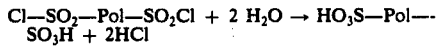

The list of functional groups mentioned, which can be substituted for the lithium atoms situated at the ends of polymer chains, is not limitative, and a man skilled in the art knows that radicals can replace lithium atoms in such polymers.

U.K. Pat. Nos. 906,315 and 946,092 and U.S. Pat. No. 3,074,917, as well as the article in Bull. Soc. Chem. 1958, 1497 (No. 252) describe such processes for fixing functional groups to α-ω dilithic polymers.

The α,ω functionalized polymers so obtained can react on adequate functions carried on different polymers or polyfunctional agents and permit polycondensation, or reticulation, if the functionality of the agents is sufficient, thus giving rise to new compounds.

As an example, the reaction of isocyanate on OH sites may be mentioned:

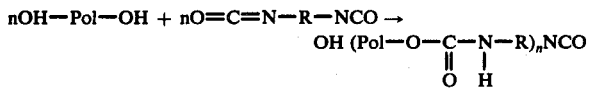

or again, the reaction of carbonyl groups with diepoxides or diamines, and the reaction of terminal halogen groups with organic diamines.

It also becomes possible to prepare sequential copolymers directly, as the process of the invention enables oligomers or polymers to be obtained having very active chain ends and whose mean molecular masses are only moderately high.

An S-B-S polymer (polystyrene-polybutadiene-1,4 polystyrene) can therefore be obtained by the action of a dilithic 1,4-polybutadiene on styrene according to the invention.

The choice of polymers it is desired to obtain will be determined by the man skilled in the art according to the properties required. It will thus be possible to prepare a vulcanizable elastomer copolymer containing, on the one hand, a 1-4 polybutadiene and/or a 1-4 cis polyisoprene and, on the other hand, a rigid polymer such as a polystyrene on each side of the polydiene sequence. Such compounds have already been described in U.K. Pat. No. 1,174,323 but their formation necessitates the presence of "Ziegler" type catalysts whereas the polymers of the invention can react directly, as the macromolecules obtained can have a low mean molecular mass and have extremely active chain extremities.

In fact, one of the characteristics of the invention is to permit low molecular mass polymers to be obtained. The advantages of such small masses lies in the possibility of obtaining liquid, waxy or pasty polymers which are therefore easy to use, and the active α,ω extremities of which are then reacted.

The man skilled in the art will therefore understand that the preparation of dilithic oligomers or low mass dilithic polymers, according to the invention, also makes it possible to obtain large mass monodispersed samples from prepared liquid polymers using the seeding technique.

As has already been mentioned, the polymers of the invention are α-ω dilithic polymers and have a concentration of active extremities never previously obtained. Said polymers are characterized in that the concentration of active extremities is higher than $10^{-3}$ mole/liter and more particularly higher than $10^{-2}$ mole/liter.

A consequence of said high concentration is, firstly, the strong reactivity of the polymers, which was brought out in the reactions previously described and, secondly, the formation of gels, or more exactly thixotropes, notably in the case of the polybutadienyl and polyisoprenyl dilithium oligomer. Such a result has never previously been observed.

The extremely important character of these observations should be emphasized for two reasons:

as the aforementioned dilithic polymers had never been obtained in such a physical form, said products obtained by polymerization catalyzed by very finely divided lithium, are new, the formation of a thixotrope notably reflects the high concentration of active extremities and confirms that these are α-ω dilithic macromolecules.

It is possible to cause the "gel" structure to disappear by the addition of methanol or water, for example, which destroys the active extremities.

The α-ω dilithic oligomers of isoprene and butadiene of the invention are, therefore, also characterized in that they are soluble in a non-polar medium such as hexane or benzene or are in the form of gels.

The process of polymerization, or more precisely, of oligomerization of the invention, is characterized by the use of very finely divided lithium as catalyst, the mean diameter of the particles being no larger than 2μ, and more particularly being 0.1μ or less.

The finely divided lithium can be obtained by the process described in commonly-assigned parallel patent application Ser. No. 653,747, filed concurrently herewith for "Very finely divided lithium and process for manufacturing same".

In a preferred form of embodiment, said process consists in entraining in a stream of inert gas, such as argon, the metallic vapour produced by heating lithium in a furnace. The inert gas-metallic vapour mixture is suddenly cooled, thus causing the condensation of fine metallic particles, the mixture consisting of the inert gas and metallic particles in suspension is filtered on a bed consisting of glass or steel balls which are stirred slowly and regularly. The lithium particles are deposited on the surface of said balls. Said process makes it possible to obtain lithium with a chemically clean surface and a mean mesh size of less than 2μ and more exactly in the order of 0.1μ or less.

The polymerization reaction is advantageously effected in the reactor containing the bed of balls covered with lithium in which the solvent and the monomer or monomers will be added successively, preferably at low temperature, in order to ensure good dispersal of the lithium which is further vaporized by stirring the glass balls. The temperature will preferably be in the range of −40° C to −10° C, dispersal being more difficult at a higher temperature or in the absence of a monomer.

After dispersal has been effected, the temperature can be raised to effect polymerization; said reaction can take place in a wide temperature range of between about −40° C to +25° C or higher.

A lower temperature will make it possible to obtain oligomers of lower mass, of approximately about 1000, whereas a rise in temperature will induce the formation of polymers having a larger mean mass, of up to 50,000 or more.

A man skilled in the art could, for routine trails, determine the adequate reaction temperature to obtain a polymer of given mass.

The amount of catalyst affects the concentration of active extremities, it will therefore be determined by the C—Li bond concentration which it is desired to obtain.

As a solvent, the solvents traditionally used can be used, whether they be polar or non-polar, but non-polar solvents, such as saturated hydrocarbons such as hexane or heptane, or benzene will be preferred, particularly for polymerizations of conjugated diene monomers.

The polymerizable monomers can, as has already been stated, notably be conjugated dienes such as isoprene or butadiene, or vinyl monomers such as styrene and its alkyl derivatives or acrylonitrile.

In the case of copolymerizations, a mixture of two or more of said monomers can be used.

The solvents and monomers for carrying out the process should preferably be purified. For example, the solvents are distilled from sodium wires, then redistilled after the addition of butyllithium. The dienes are submitted to two distillations, a first distillation removing the antioxidant, they are then passed through a molecular sieve and redistilled.

Another object of the present invention is a device for the preparation of low molecular mass $\alpha$-$\omega$ dilithic polymers and copolymers in a preferably non-polar medium.

The device consists essentially of a reactor comprising inert gas, inlet and outlet means, means for stirring the reaction mixture and means for withdrawing a fraction of the reaction mixture during polymerization, in order to follow the progress of the reaction. With this end in view, a device such as a grid is positioned at the bottom of the reactor to hold the glass balls on which fine lithium particles have been deposited. It will be possible to cool the reactor by any known system, for example with a cooling bath full of ethylene glycol or another compound according to the temperature it is desired to attain. The cooling bath can be provided with a thermostat.

A particular mode of embodiment of said device is shown in FIG. 1 wherein 1 is the reactor, the solvent and monomer are supplied at 3, the stirrer 4 is provided with three screws and can be driven magnetically (5); a fraction of the reaction mixture is drawn off at 6, the glass balls 8 covered with lithium particles are supported on a fine grid 7; the mixture of solvent (for example heptane) and the monomer are shown at 9. The tank 113 containing ethylene glycol 114 is cooled by a system of known type 112.

Figure 2:
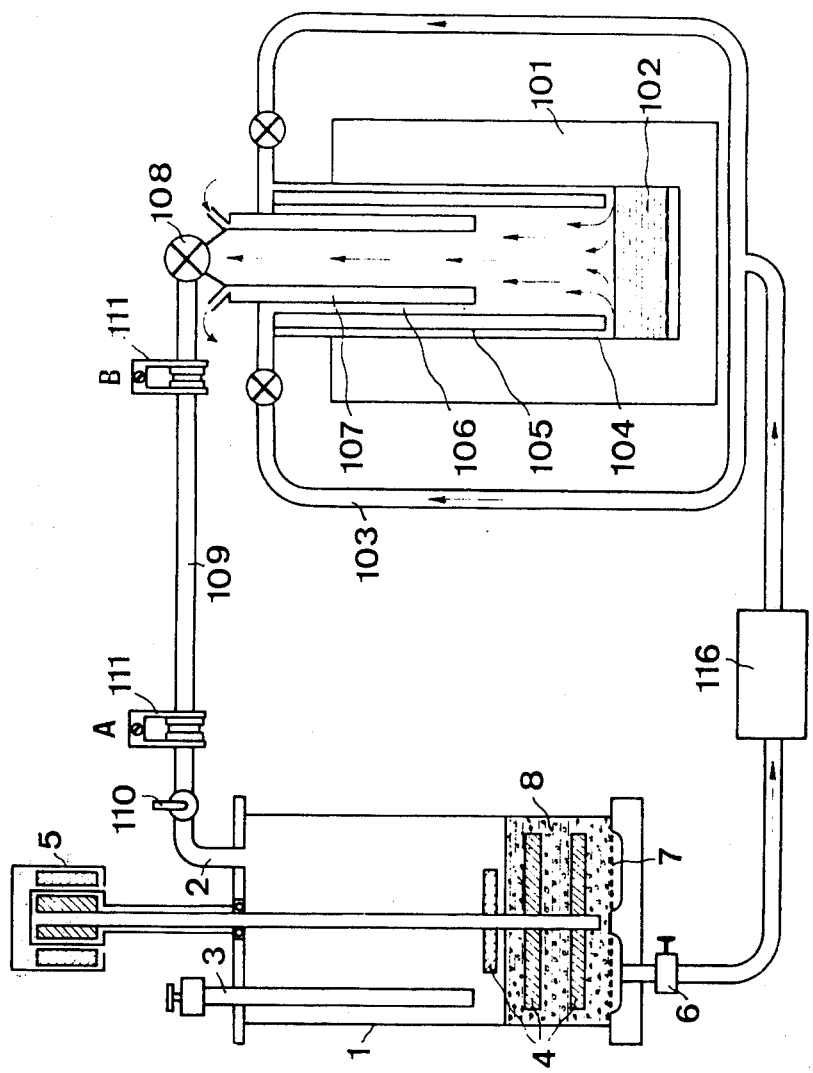

FIG. 2 shows a mode of embodiment of a device making it possible to obtain finely divided lithium; the furnace is shown at 101, the sides with O-rings 111 enable the furnace and the reactor to be disconnected, the fine particles leave the furnace at 108 (ball valve), pass into conduit 109, ball valve 110, the inlet 2 of reactor 1 and are deposited on the glass balls 8 having a mean diameter in the order of 5/10 mm; said balls, which lie on a fine metal grid 7, are stirred by the stirrer 4 driven by motor 5. The gas free from lithium particles filtered by the bed of balls leaves the reactor at 6, device 116 making it possible to isolate small amounts of nitride and oxide which form the first few times the gas passes through the system. This can, for example, be a by-pass filter, said device 116 also comprising a pump, for example a membrane type pump, which makes it possible to ensure a pressure and flow rate sufficient to reintroduce the inert gas into the furnace.

An apparatus used in the laboratory comprised a 10 cm thick layer of balls of a diameter of 5/10 mm.

The following examples are intended to illustrate the invention while in no way limiting its scope.

EXAMPLE 1

0.5g of metallic lithium in the form of a very fine powder was deposited on 60g of glass balls of a diameter of 500$\mu$.

A solution of 10g isoprene in 100 cm$^3$ heptane is added to this suspension at $-40°$ C. The suspension thus obtained is stirred at $-40°$ C for 8 days. The suspension is then filtered to remove the glass balls and the metal, and the solution obtained is left at ordinary temperature for polymerization and is then evaporated to recover the 10g of polyisoprene obtained.

The sample of polyisoprene thus obtained:
has a molecular mass of 2000
is $\alpha,\omega$ dilithic
has 85% 1-4 cis stereoregularity
has a fairly low distribution of molecular masses ($M_w/M_n < 1.5$).

EXAMPLE 2

Oligomerizations of butadiene and isoprene

After distillation of 200 mg of metal, 1 liter of solvent is introduced into the reactor. The temperature is lowered to $-10°$ C and slow stirring disperses the metal which then forms a very stable suspension.

Said suspension can be drawn off into another apparatus and the monomer added (10% by volume). The mixture is maintained at $-10°$ C with slow stirring.

The reaction starts rapidly and once dilithic oligomers have formed samples can be taken to determine the concentration of C—Li bonds formed.

The polymerization reaction is slow at a temperature of $-10°$ C. When the desired concentration of dilithic macromolecules is reached, it is enough to raise the temperature to 30° C or higher to cause the residual monomer to polymerize rapidly. This makes it possible to prepare oligomers of an exact molecular mass. In this typical experiment, 1-4 cis polyisoprene is obtained with a molecular mass of 5000 and a concentration of lithic extremities of approximately $2.10^{-2}$ mole/liter.

Said result is an improvement by a factor greater than 100 and sometimes 1000 the amount of lithic extremities formed per gram of lithium introduced compared with control experiments conducted according to the process of division with vaseline.

A substantial portion of the metal introduced is converted into a soluble derivative and the residual particles only constitute a few percents of the initial metal.

EXAMPLE 3

The trials summarized in table I below demonstrate the high concentrations of active extremities obtained by the embodiment of the process of the invention.

TABLE I

| Trial | T° C | Monomer cm³ | Solvent cm³ | Weight of lithium mg | Molecular weight | Concentration of active extremities | |
|---|---|---|---|---|---|---|---|
| 1 | −25 | isoprene 60 | heptane 600 | 100 | 11,600 | $1.1 \cdot 10^{-2}$ | mole/liter |
| 2 | −15 | isoprene 60 | heptane 260 | 200 | 5,000 | $2.5 \cdot 10^{-2}$ | mole/liter |
| 3 | −10 | isoprene 60 | benzene 340 | 110 | 11,000 | $1.2 \cdot 10^{-2}$ | mole/liter |
| 4 | + 3 | isoprene 60 | heptane 600 | 15 | 28,000 | $5 \cdot 10^{-3}$ | mole/liter |
|  | −15 | butadiene 60 | heptane 600 | 100 | 40,000 | $2.7 \cdot 10^{-3}$ | mole/liter |

By way of comparison, table II shows polymerizations effected by the conventional process using a suspension of lithium in vaseline as catalyst.

TABLE II

| T° C | Monomer cm³ | Solvent cm³ | Weight of lithium mg | Molecular weight | Concentration of active extremities |
|---|---|---|---|---|---|
| +25 | isoprene 12.5 | heptane 250 | 13,000 | 200,000 | $3.4 \cdot 10^{-4}$ mole/liter |
| +25 | " | " | 5,900 | 400,000 | $1.7 \cdot 10^{-4}$ mole/liter |
| +25 | " | " | 2,700 | 700,000 | $9.7 \cdot 10^{-5}$ mole/liter |

EXAMPLE 4

The trials described in this example demonstrate the formation of a gel structure when polymerizations according to the invention are effected.

Oligomerization of 200 cm³ of isoprene at −30° C for 2 hours in 600 cm³ of heptane in the presence of 300 mg very finely divided lithium (mean particle size 0.1μ or less), then for 3 hours at 30° C for polymerization makes it possible to obtain a 1–4 cis polyisoprene having an average molecular mass of 25,000 and having a concentration of active extremities of 1.8. $10^{-2}$ mole/liter. Said polymer "takes" as a gel at the end of the reaction, it is possible to cause it to disappear by the addition of a few drops of methanol which destroys the active extremities.

The addition at the end of a reaction of 2 cm³ of diphenyl-1,1 ethylene causes the appearance of a deep red color, and lowers the viscosity of the compound. Such modified polymer may be cross-linked as described hereunder.

A reticulated gel is formed by the addition of a few drops of divinyl-benzene to the dilithic polyisoprene of molecular mass 11,000 obtained in trial 3 of table I. The difunctional character is thus confirmed.

The gel is usually formed in a few minutes, but this time may be reduced to a few seconds by addition of about 1 cm³ of tetrahydrofurane.

We claim:

1. In a process for the polymerization of monomers comprising reacting at least one conjugated dienic monomer in the presence of an inert solvent and suspended lithium as a polymerization initiator at a temperature between about −40° C to +25° C, the improvement consisting of employing lithium having an average particle diameter of less than about 2 μ.

2. A process according to claim 1, wherein the average particle diameter of lithium is less than 0.1μ.

3. A process according to claim 1, wherein the lithium particles are first deposited on a divided substrate such as small sized solid bodies and thereafter suspended in said inert solvent before said polymerization.

4. A process according to claim 3, wherein the lithium particles are deposited on glass balls of an average diameter in the range of 2 to 0.2 mm and preferably of 5/10 mm.

5. A process according to claim 1, wherein the monomer is a diene monomer selected from the group consisting of isoprene or 1,3-butadiene.

6. A process according to claim 1, wherein an additional vinyl monomer is present selected from the group consisting of styrene and its alkyl derivatives or acrylonitrile.

7. α-ω dilithic polymers, such polymers being soluble, notably in a non-polar solvent, or in the form of gels, produced by the process of claim 1.

8. α-ω dilithic polymers according to claim 7, wherein the concentrations of dilithic extremities is $5 \cdot 10^{-3}$ mole/liter or higher, and more particularly higher than $10^{-2}$ mole/liter.

9. Polymers according to claim 7, consisting of polybutadienyl-dilithium or polyisoprenyl-dilithium products.

* * * * *